(No Model.)
S. F. VOORHEES.
FOLDING PLATFORM FOR GRAIN HARVESTERS.
No. 374,814. Patented Dec. 13, 1887.
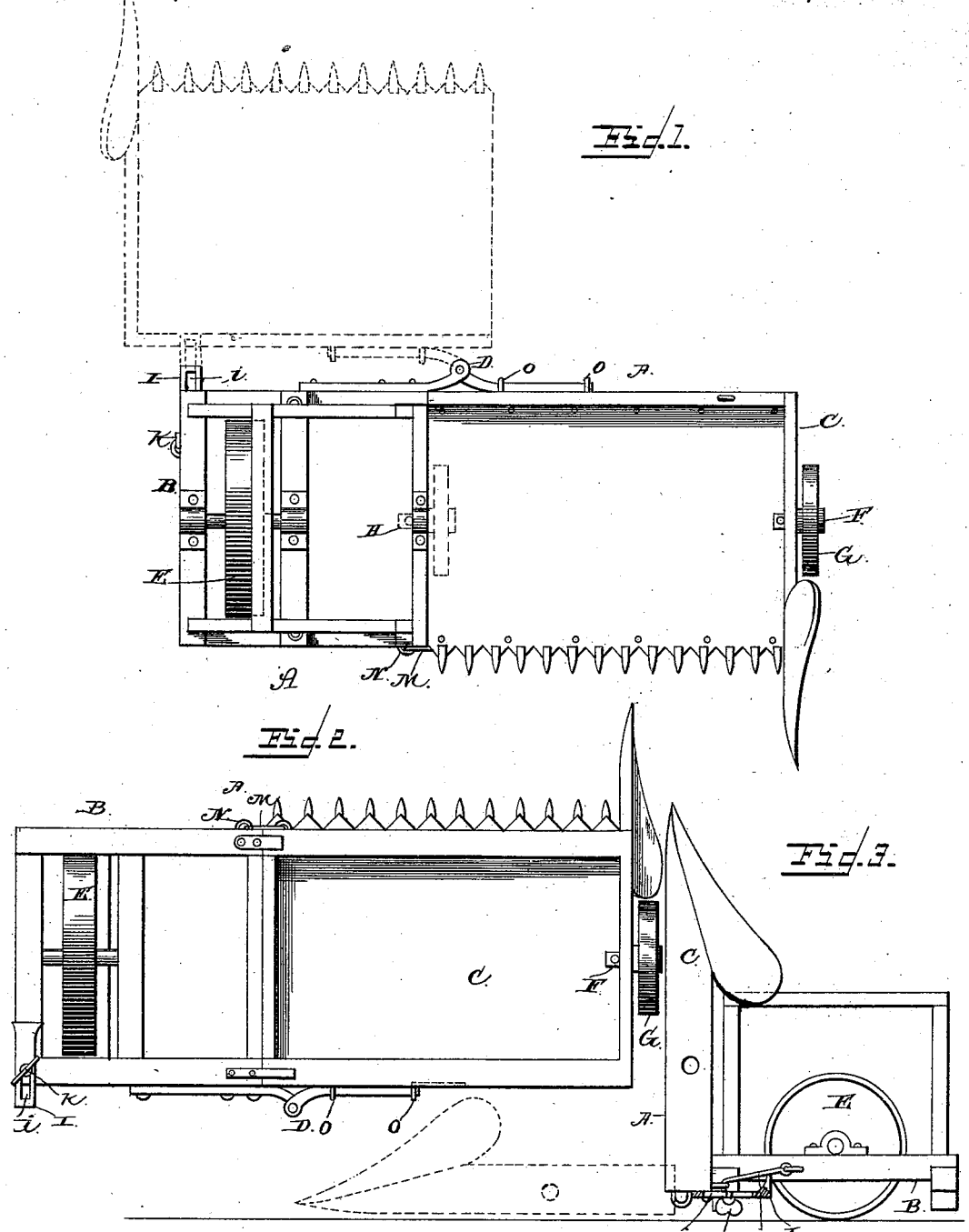

United States Patent Office.

STEPHEN FRANCIS VOORHEES, OF ADRIAN, MICHIGAN.

FOLDING PLATFORM FOR GRAIN-HARVESTERS.

SPECIFICATION forming part of Letters Patent No. 374,814, dated December 13, 1887.

Application filed July 28, 1886. Serial No. 209,331. (No model.)

*To all whom it may concern:*

Be it known that I, STEPHEN FRANCIS VOORHEES, a citizen of the United States, residing at Adrian, in the county of Lenawee and State of Michigan, have invented a new and useful Improvement in Folding Platforms for Grain Harvesters or Binders, of which the following is a specification.

My invention relates to an improvement in folding platforms for grain-harvesters; and it consists in the peculiar construction and combination of devices that will be more fully set forth hereinafter, and particularly pointed out in the claims.

The object of my invention is to provide a harvester or binder platform with a hinged joint, whereby that portion of the platform carrying the cutting apparatus may be swung around in rear of that portion of the platform carrying the usual gear-wheels, thus reducing the excessive width of the binder or harvester and enabling the same to be readily transported along an ordinary country road, over narrow bridges, and through gates.

In the drawings, Figure 1 is a top plan view of the platform of a harvester or binder provided with my improvements, showing (in dotted lines) that portion of the platform which carries the cutting apparatus swung around and in rear of that portion of the platform provided to carry the gearing. Fig. 2 is a bottom plan view of the same. Fig. 3 is a side elevation of the machine, the platform being folded, and the supporting-arm of said platform being shown partly in section. The position of the platform after it has been swung to the rear, but before it is folded, is shown in dotted lines.

A represents the front portion of a grain harvester or binder, of which B is the main frame, and C is the platform-frame, the said frames being connected together at their rear sides by a hinge, D. The platform-frame is of much greater length than the main frame, and is provided with the usual cutting apparatus. The main frame is adapted to support the usual gearing employed to transmit the motion of the driving and supporting wheel E, which is journaled in the said frame to the various portions of the machine.

From the outer side of the platform-frame projects a bearing spindle, F, upon which is journaled a supporting-wheel, G, which is smaller than the wheel E, and the function of which is to support the outer end of the platform-frame to prevent it from dragging on the ground. From the side of the main frame which bears against the inner end of the platform-frame, when the said frames align with each other, as shown in solid lines in Figs. 1 and 2, extends a bearing-spindle, H, which is adapted to form the journal for the small supporting-wheel G when the platform-frame is folded in rear of the main frame B, as shown in dotted lines in Fig. 1. In order to support the said platform-frame C in this folded position, I provide the frame B with rearwardly-adjustable supporting-arms I, having longitudinal slots $i$, and secured to the under side of the frame B, at the rear side thereof, by means of set screws or bolts K. When the rear ends of the said supporting-arms are moved outwardly from the frame B, the platform-frame rests upon the said arms when the same is folded, as shown in Fig. 3. The frame B is also provided with a hook, L, or other suitable device to secure the platform-frame to the said frame B when the platform is folded.

When the frames B and C align with each other, their inner meeting ends are secured together on their front sides by a catch, M, which is pivoted to the platform-frame C and engages a keeper, N, secured to the frame B.

A harvester or binding machine provided with my improved form of folding platform may be readily narrowed by folding the platform-frame C in rear of the main frame, thus adapting the machine to be transported over ordinary country roads and through farm-gates without the necessity of placing it upon trucks.

In order to permit the platform-frame C to be folded vertically against the rear side of the frame B, I pivot the outer arm of the hinge in keepers O, which are secured to the rear side of the platform-frame C, thus forming a joint or hinge connecting the frames B and C together. By thus adapting the platform-frame C to be swung around in rear of the frame B, and folded vertically against the same, the machine is adapted to be stored in a comparatively small space, and is also rendered much more easy to transport.

Having thus described my invention, I claim—

1. The combination of the main frame, the horizontally-swinging arm hinged thereto on its rear side, the platform-frame hinged on the said arm and adapted to turn thereon into a vertical position, and the support I, projecting from the rear side of the main frame to support the platform-frame when swung to the rear and turned into its vertical position, substantially as described.

2. The combination of the main frame, the horizontally-swinging arm hinged thereto on its rear side, the platform-frame hinged on the said arm and adapted to turn thereon into a vertical position in rear of the main frame, the slotted arm I, and the screw extending through the slot therein, to secure the said arm to the main frame for the purpose set forth, substantially as described.

3. The combination, in a grain-harvester, of the main frame, the platform, and the hinge connecting them together at their rear sides, the said hinge composed of the jointed arms, one of the said arms being secured rigidly to the main frame and the other being pivoted to the platform, whereby the latter may be swung in rear of the main frame and then folded vertically against the same, substantially as described.

4. The combination of the main frame, the arm hinged thereto on its rear side by a vertical joint, and the platform-frame hinged on the said arm by a horizontal joint, whereby it is adapted to turn thereon into a plane parallel with the pintle of the hinge and be turned with the arm on its vertical pivot, substantially as described.

5. The combination of the main frame, the arm hinged thereto on its rear side by a vertical joint, and the platform-frame hinged to the arm by a horizontal joint, whereby the platform-frame is adapted to turn on the arm and be turned with said arm on its vertical pivot, and the hook-rods to connect the main frame to the platform-frame, when the latter is in a vertical position, substantially as described.

In testimony that I claim the foregoing as my own I have hereto affixed my signature in presence of two witnesses.

STEPHEN FRANCIS VOORHEES.

Witnesses:
N. W. VOORHEES,
HOPE H. N. VOORHEES.